United States Patent [19]

Jeffers

[11] Patent Number: 4,760,582
[45] Date of Patent: Jul. 26, 1988

[54] SCALABLE OVERTONE HF CHEMICAL LASER

[76] Inventor: William O. Jeffers, 8429 N. 73rd St., Longmont, Colo. 80501

[21] Appl. No.: 700,123

[22] Filed: Feb. 11, 1985

[51] Int. Cl.[4] .................................... H01S 3/095
[52] U.S. Cl. .................................. 372/89; 372/90; 372/58
[58] Field of Search .................. 372/89, 90, 55, 58

[56] References Cited

U.S. PATENT DOCUMENTS

| 3,706,942 | 12/1972 | Ultee | 372/89 |
|---|---|---|---|
| 3,986,137 | 10/1976 | Ehrlich et al. | 372/89 |
| 4,188,592 | 2/1980 | Buczek et al. | 372/89 |
| 4,213,102 | 7/1980 | Warren et al. | 372/89 |
| 4,217,557 | 8/1980 | Foster et al. | 372/89 |
| 4,375,687 | 3/1983 | Hook et al. | 372/89 |
| 4,483,006 | 11/1984 | Ortwerth et al. | 372/89 |
| 4,487,366 | 12/1984 | Davis et al. | 372/89 |
| 4,488,311 | 12/1984 | Davis et al. | 372/89 |
| 4,517,676 | 5/1985 | Meinzer et al. | 372/89 |

Primary Examiner—William L. Sikes
Assistant Examiner—Robert E. Wise
Attorney, Agent, or Firm—Dorr, Carson, Sloan & Peterson

[57] ABSTRACT

A chemically driven HF overtone laser operates from either thermal or electrical dissociation of a molecular gas containing fluorine. Significant output powers are produced from $\Delta v = 2$ vibrational transitions. Free F atoms produced by both thermal and electrical dissociation techniques are reacted with a molecular gas containing hydrogen to produce excited HF molecules. Overtone transitions, i.e., $\Delta v = 2$ transitions are preferentially depleted by both optical enhancement and preinjection techniques to produce overtone laser transitions.

47 Claims, 4 Drawing Sheets

SCALABLE OVERTONE HF CHEMICAL LASER

BACKGROUND OF THE INVENTION

The present invention pertains generally to lasers and more specifically to HF chemical lasers.

The first continuous wave (cw) hydrogen fluoride (HF) chemical laser was demonstrated by Spencer et al, as reported by D. J. Spencer, T. A. Jacobs, H. Mirals, and R. W. F. Gross, *Int. J. Chem. Kinetics*, (1969) Vol. 1, pg. 493. Prior to that work, various pulsed or quasi-cw chemical lasers were observed, dating back to the first chemical laser, i.e., the pulsed HCl chemical laser in 1965, as reported by J. V. V. Kasper and G. C. Pimentel, *Appl. Phys. Lett.*, (1964) Vol. 5, pg. 231, and R. W. F. Gross and J. F. Bott, *Handbook of Chemical Lasers*, (New York, 1976). These articles are specifically incorporated herein by reference for all that they disclose.

Both HF and DF chemical lasers have proven to be of particular interest to the laser community since they can be chemically driven and are scalable to very high output powers for both cw and pulsed operation. Chemically driven lasers principally derive energy from a chemical reaction to populate excited states and, consequently, do not require high input powders from low efficiency mechanisms.

HF lasers, to date, operate on fundamental transitions which constitute vibrational population inversions over a single vibrational transition ($\Delta v=1$). These transitions primarily occur from the $v=2$ to $v=1$ vibrational levels and $v=1$ to $v=0$ vibrational levels. These fundamental transitions provide scalable output powers in a chemically driven laser which produces extremely useful ouput frequencies in the near infrared spectral region. Continuous wave (cw) HF lasers are commonly available for laboratory use which produce output powers of up to 200 watts in the 2.8 to 3.8 micron regions. Both combustion driven cw HF lasers and electrical discharge pulsed HF lasers are capable of producing extremely high output powers on the fundamental transitions, i.e., $\Delta v=1$.

Although these fundamental transitions produce wavelengths in the 2.8 and 3.8 micron region which are extremely useful in a number of applications, high-power lasers having shorter wavelengths, e.g., in the near ir and spectral region, would also have great utility. For example, various transmission windows exist for atmospheric transmission in the near ir and visible spectral region. Consequently, a laser which could produce a high-power output in the near ir spectral region could be efficiently propagated through the atmosphere for purposes such as power transmission, communications, and various other functions.

High-power laser sources in the near ir region have not only been the subject of intensive research in the past few years because of the atmospheric transmission characteristics of near ir radiation, but for other reasons such as power coupling efficiencies of this wavelength radiation with solid materials. For example, a significant amount of research has been done regarding the power coupling efficiencies of shorter wavelength laser radiation to laser fusion pellets in order to produce a controlled thermonuclear reaction. Power coupling efficiencies of shorter wavelength radiation are also of interest in materials testing experimentation.

Moreover, transmission of laser radiation over standard fiberoptic (silica) materials is much more efficient at near ir frequencies than at longer wavelengths. At near ir frequencies, several hundred watts can be transmitted via conventional fiberoptic materials over long distances, i.e., on the order of miles. Transmission of high powers via fiberoptics would allow conventional silica fiberoptic materials to be used in laser surgery. Currently, special fiberoptic materials must be used to transmit laser radiation at high powers for the frequencies produced by currently available lasers. These materials have been found to be expensive and toxic to the human body, requiring the use of additional expensive coatings of the toxic fiberoptic material. These disadvantages could be overcome by the production of a high-power laser source in the near ir spectral region which could be transmitted through inexpensive, non-toxic silica fiber-optic materials.

Consequently, there has been a significant effort by both government and private industry to develop a high-power laser in the visible and near ir spectral region. To date, however, a scalable high power laser has not been produced which lases in the near ir or visible spectral region despite the intensive effort by both the government and private industry to develop such a laser.

In an attempt to develop such a laser, various techniques have been used to achieve a wide range of laser output frequencies from laser media, such as molecular gases, which are capable of producing scalable high power lasers. A selection of various vibrational and rotational transitions of molecular gases results in a large number of possible spectral lines which can be produced by a particular molecular gas. For example, 33 different vibrational transitions and 37 different pure rotational transitions for the HF molecule are listed in *Introduction to Gas Lasers: Population Inversion Mechanisms*, Colin S. Willett, (Pergamon Press: New York, N.Y., 1974), which is specifically incorporated herein by reference for all that it discloses. Studies of vibrational transitions of molecular gases have indicated that certain vibrational transitions known as fundamental transitions are much more likely to occur than other transitions. For example, overtone transitions have been reported by both F. G. Sadie, P. A. Buerger, and O.G. Malan in *Journal of Appl. Phys.*, (1972), Vol. 43, No. 6, p. 2906, and Steven N. Suchard and George C. Pimentel in *Applied Phys. Lett.*, (1971) Vol. 18, p. 530 for a continuous wave overtone CO chemical laser and a pulsed deuterium fluoride (DF) vibrational overtone chemical laser, respectively. Both of these articles are specifically incorporated herein by reference for all that they disclose. As both of these articles disclose, and as commonly believed in the industry, overtone transitions do not produce output powers or efficiencies which approach the output powers obtainable from fundamental transitions. As specifically disclosed in the Suchard and Pimentel article, threshold levels were barely able to be reached using overtone transitions in DF molecular gas. Additionally, Suchard et al and Sadie et al both utilized photo-dissociation techniques which are an extremely inefficient process for producing excited vibrational states which cannot practically be scaled to higher output powers.

Another technique of shifting the spectral output of molecular gaseous lasers is the use of various isotopes of the elements of the molecular gas to obtain shifted vibrational levels. For example, a wavelength shift can be obtained through the use of deuterium fluoride (DF)

molecular gases instead of HF molecular gases to obtain a wavelength shift of the spectral lines. However, since deuterium fluoride is a heavier molecule than hydrogen fluoride, longer wavelength radiation is produced by DF, rather than shorter wavelength radiation. Consequently, the prior art has indicated that production of shorter wavelength radiation using standard techniques of frequency shifting has not been obtainable in a laser which is scalable to high powers.

SUMMARY OF THE INVENTION

The present invention overcomes the disadvantages and limitations of the prior art by providing a high-power scalable HF laser which operates on overtone vibrational transitions. The present invention utilizes thermal dissociation techniques and electrical discharge dissociation techniques to produce a scalable high-power HF chemical laser which operates on $\Delta v=2$ vibrational transitions. Consequently, the present invention may comprise a method of producing electromagnetic emissions from excited HF molecules at overtone frequencies comprising the steps of thermally dissociating a molecular gas containing fluorine to produce F atoms, reacting the F atoms with a gas-containing hydrogen to produce excited HF molecules, and preferentially depleting $\Delta v=2$ vibrational transitions of these excited HF molecules to produce the electromagnetic radiation at overtone frequencies.

The present invention may also comprise a method of producing electromagnetic emissions from excited HF molecules at overtone frequencies comprising the steps of, electrically dissociating a molecular gas containing fluorine to produce F atoms, reacting the F atoms with a gas containing hydrogen to produce excited HF molecules, and preferentially depleting $\Delta v=2$ vibrational transitions of said excited HF molecules to produce said electromagnetic radiation at said overtone frequencies.

The present invention may also comprise an HF overtone continuous wave chemical laser comprising, an electrical dissociation device for dissociating F atoms from a molecular gas containing fluorine by applying an electrical voltage across the molecular gas containing fluorine, a device for combining the F atoms with a molecular gas containing hydrogen to generate excited HF molecules, and an optical cavity for causing preferential depletion of $\Delta v=2$ vibrational transitions of excited HF molecules by selectively attenuating $\Delta v=1$ vibrational transitions.

The present invention may also comprise an electrical discharged HF overtone pulsed chemical laser comprising, a first molecular gas containing fluorine which is capable of being dissociated by an electrical discharge to produce F atoms, a second molecular gas containing hydrogen which is admixed with the first molecular gas to produce a fuel/oxidizer mixture, an optical cavity for causing preferential depletion of $\Delta v=2$ vibrational transitions of excited HF molecules by selectively attenuating $\Delta v=1$ vibrational transitions, and an electrical discharge device for dissociating F atoms from the fuel/oxidizer mixture to produce the excited HF molecules in the optical cavity by the chemical reaction of the F atoms with the second molecular gas such that the preferential depletion of $\Delta v=2$ vibrational transitions causes a laser emission from the optical cavity.

The present invention may also comprise a combustion driven continuous wave HF overtone chemical laser comprising, a combustion chamber for thermally dissociating a fluorine containing gas from heat produced from the chemical reaction of the fluorine containing gas with a reactant to produce a reaction product and F atoms, an expansion device for reducing the temperature of the reaction product and the F atoms, a device for combining a hydrogen containing gas with the F atoms to produce excited HF molecules, and an optical cavity for causing preferential depletion of $\Delta v=2$ vibrational transitions of the excited HF molecules by selective attenuation of $\Delta v=1$ vibrational transitions to produce an overtone laser emission from the optical cavity.

The advantages of the present invention are that the present invention is capable of producing high output powers in a scalable chemically driven HF laser at near ir frequencies which have not been previously achievable. Unlike the teachings of the prior art which indicated that overtone transitions could not produce significant output powers, the discovery of the present invention indicates that significant percentages of the output powers obtainable on fundamental transitions can be achieved from the HF molecule on overtone transitions to allow the production of a high-power scalable chemically driven overtone HF laser.

DETAILED DESCRIPTION OF THE INVENTION

Figure 1:
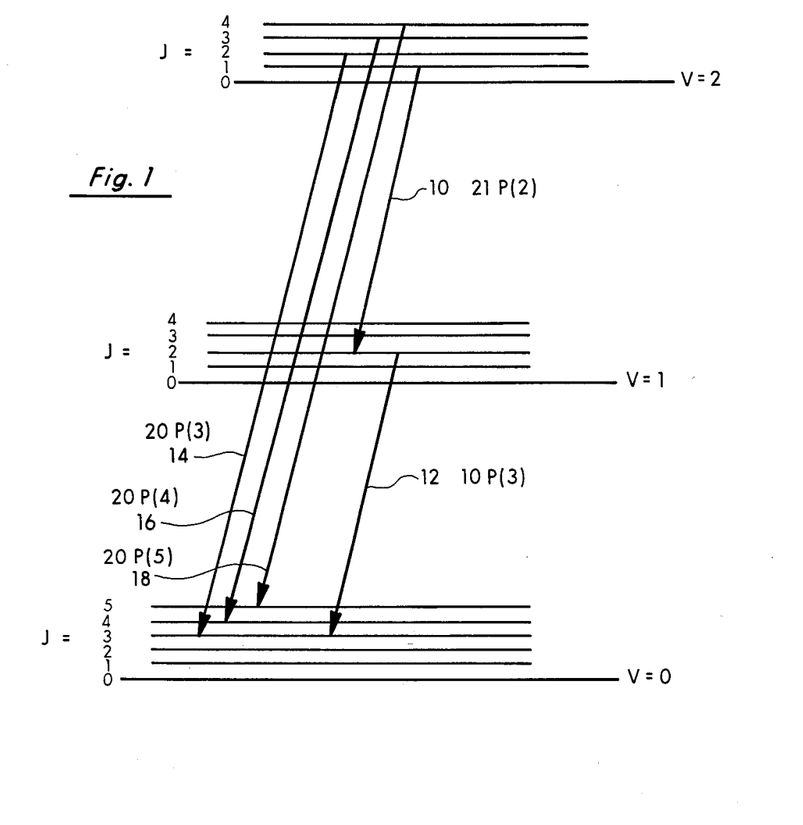
FIG. 1 is a schematic diagram illustrating the overtone transitions of HF molecules produced by the present invention as compared to fundamental transitions.

FIG. 1 is a schematic illustration of typical overtone and fundamental transitions of the HF molecule. The fundamental transitions 10 denoted by 21P(2) and 12 denoted by 10P(3) constitute typical fundamental transitions of the HF molecule. The notation used indicates the transition of vibrational levels and is labeled by the lower state J. For example, the notation 10P(3) indicates a transition from vibrational level 1 to vibrational level 0 with the lower state J level being level 3. The P-branch transition indicates a $\Delta J = +1$ transition such that the upper state J level is J=2 and the lower state J level is J=3. Fundamental vibrational transitions such as 10 and 12 typically produce outputs in the 2.6 to 3.2 spectral regions for HF molecular gases.

Transition 14, denoted by 20P(3), transition 16 denoted by 20P(4) and transition 18 denoted by 20P(5) comprise typical overtone transitions produced in accordance with the present invention in molecular HF gases. Each of the overtone transitions comprises a vibrational transition over two vibrational levels denoted by $\Delta v=2$ vibrational transitions, as opposed to fundamental transitions of the HF molecule over one vibrational level, denoted by $\Delta v=1$ vibrational transitions. Transitions 14, 16 and 18 are typical of the overtone transitions which can be produced in accordance with the present invention. The present invention is capable of producing a multiplicity of overtone transitions comparable to the multiplicity of fundamental transitions which have been reported, such as disclosed in Willett, supra. In this regard, the present invention is not limited to vibrational transitions from the $v=2$ to $v=0$ vibrational levels but can also operate on the $v=3$ to $v=1$ vibrational transition levels. Greatest output power is achieved on the $v=2$ to $v=0$ overtone vibrational transition because of vibrational population ratios.

The overtone chemical laser of the present invention depends upon the production of vibrationally excited HF molecules by the gas phase reaction of F atoms with molecular hydrogen:

$$F+H_2 \rightarrow HF^* + H - 31.5 \text{ Kcal/mol.} \tag{1}$$

Figure 2:
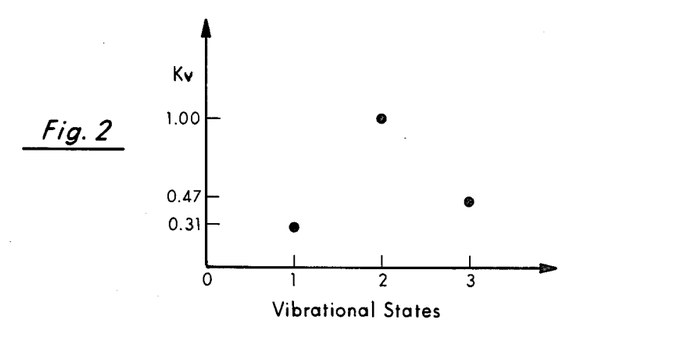
FIG. 2 is a graph of the rate constant ratio $k_v$ for populating vibrational states from chemically produced HF molecules.

As set forth in FIG. 2, the relative rates for formation into excited vibrational states $k_v$ for HF are $k_0=0$, $k_1=0.31$, $k_2=1.00$, $k_3=0.47$. Hence, 66% of the reaction energy is channeled into vibrational energy of the product molecule. HF chemical lasers developed in accordance with the prior art operate on fundamental P-branch vibrational transitions:

$$(v, J-1) \rightarrow (v-1, J) + h\nu_{\Delta v=1} \tag{2}$$

The corresponding wavelengths for these fundamental vibrational transitions lie in the region of 2.6 to 3.0 microns for HF and 3.6 to 4.0 microns for DF.

The present invention demonstrates the use of overtone vibrational transitions:

$$(v, J-1) \rightarrow (v-2, J) + h\nu_{\Delta v=2} \tag{3}$$

In accordance with the present invention, the laser wavelengths from overtone transitions of HF are in the range of 1.3 to 1.4 microns. An advantage of the present invention is that it can produce laser outputs comparable in output power at a shorter wavelength than previous chemical lasers.

FIG. 2 illustrates the rate constant ratio $k_v$ plotted against the vibrational states. The rate constant ratio comprises a reaction rate for populating higher vibrational states and can be related to the vibrational populations $N_v$. As indicated in FIG. 2, the $v=2$ vibrational level constitutes the vibrational level which is populated at the highest rate. The $v=1$ vibrational level is a rate constant which is only 31% of the rate constant of the $v=2$ vibrational level. Similarly, the $v=3$ vibrational level has a rate constant which is only 47% of the rate constant of the $v=2$ vibrational level. Therefore, it appears from FIG. 2 that the $v=2$ vibrational state is populated at a rate which is more than twice the population rate of other vibrational states. Hence, a large number of molecules are available to produce overtone vibrational transitions from the $v=2$ to $v=0$ overtone vibrational transition such that high output powers can be produced.

Figure 3:
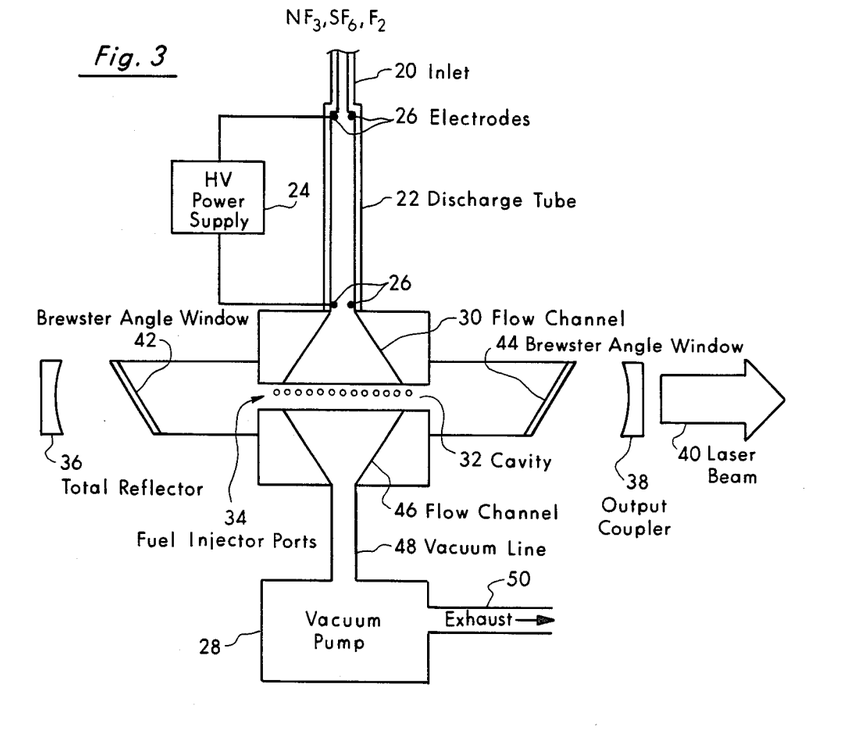
FIG. 3 is a schematic block diagram of an electrical dissociation driven cw overtone chemically driven HF laser.

FIG. 3 is a schematic illustration of the electrical dissociation cw overtone HF laser comprising one embodiment of the present invention. A first molecular gas containing fluorine, such as $NF_3$, $SF_6$, $F_2$, etc., is inserted through inlet 20 into a discharge tube 22. High voltage power supply 24 sustains a discharge between electrodes 26 in discharge tube 22 to partially dissociate the first molecular gas containing fluorine and produce free F atoms. Oxygen can also be added to inlet 20 to combine with free radicals, such as sulfur produced as a result of the partial dissociation of the first molecular gas containing fluorine. In the case of the $SF_6$, the oxygen added to discharge tube 22 combines to prevent sulfur deposits from forming on the walls of the laser cavity.

Vacuum pump 28 causes the input gas to flow through inlet 20, discharge tube 22 and flow channel 30. Flow channel 30 causes the gas containing F atoms to be formed into a sheet flow by virtue of the channel shape. This shape is more clearly illustrated in FIG. 4. The sheet flow of gases produced by flow channel 30 enters cavity 32 adjacent to fuel injector 34. Fuel injector 34 functions to inject a second molecular gas containing hydrogen, such as $H_2$, $CH_4$, etc., into the sheet flow of the first molecular gas containing F atoms such that the two gases rapidly mix. The free F atoms combine with hydrogen contained in the second molecular gas to produce excited HF molecules in cavity 32. An optical resonating cavity comprising total reflector 36 and output coupler 38 is aligned with cavity 32. The optical cavity causes strong coupling of the excited HF molecules such that a laser beam 40 is formed and output coupled through output coupler 38. Brewster angle windows comprise a portion of the vacuum cavity of the device illustrated in FIG. 3. The optical cavity is designed to preferentially deplete $\Delta v=2$ vibrational transitions of the excited HF molecules to produce overtone transitions. After lasing, the depleted gas is transported through the downstream flow channel 46, vacuum line 48 via vacuum pump 28 to exhaust 50.

To obtain an overtone transition rather than a fundamental transition, the optical resonant cavity is designed to have appropriate losses to attenuate fundamental transitions, i.e. $\Delta v=1$ transitions. In this manner, the losses induced in the cavity at fundamental transitions prevent lasing powers from reaching a threshold value, while simultaneously allowing overtone transitions to reach power levels greater than lasing threshold.

Figure 4:
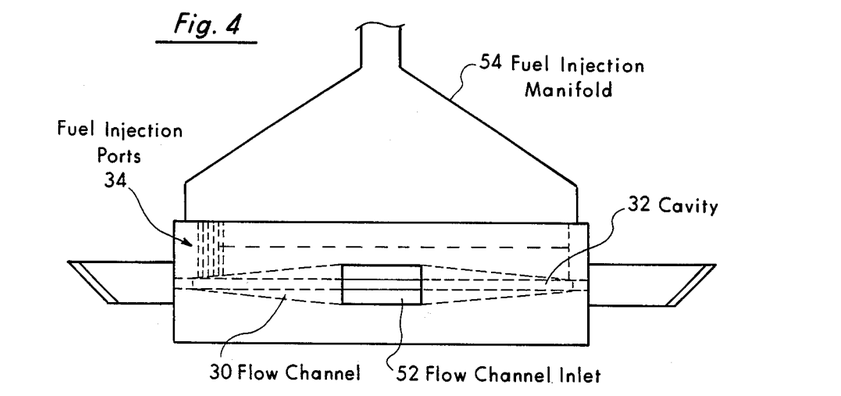
FIG. 4 is a schematic block diagram illustrating flow channel protions and flow injection portions of the device of FIG. 3.

FIG. 4 is a schematic sideview of a portion of the device illustrated in FIG. 3. As illustrated in FIG. 4, flow channel 30 is coupled to a flow channel inlet 52. Flow channel 30 changes the geometrical shape of the gas flow of discharge tube 22 from a block-like rectangular shape into a sheet flow as it enters into cavity 32. This allows for complete mixing of the molecular gas containing fluorine with the molecular gas containing hydrogen which is injected through fuel injection ports 34. The molecular gas containing hydrogen, such as $H_2$, is dispersed by fuel injection manifold 54 which allows the molecular gas containing hydrogen to be uniformly dispersed over all of the fuel injection ports 34. The fuel injection ports 34 are aligned in cavity 32 to allow downstream mixing of the two gases to produce lasing within the optical cavity.

The experimental device used to demonstrate the present invention was an electrical dissociation driven cw overtone HF laser similar to that shown in FIGS. 3 and 4. The following description provides a disclosure of the experiment used to demonstrate the present invention.

EXPERIMENTAL RESULTS

The experiment utilized a modified Helios Model CLI laser which is available from Helios Incorporated, 1822 Sunset Place, Longmont, Colo. 80501 and is described in detail in a twelve-page bulletin available from Helios Incorporated, which is specifically incorporated herein by reference for all that it discloses.

The modified laser, as set forth above, resembles the laser schematically illustrated in FIGS. 3 and 4. The Helios Model CLI laser was modified to operate in the 1.3 micron region. The important device parameters prior to modification for operation in accordance with the present invention are disclosed in Table I below.

TABLE I

| Model CLI Device Parameters | |
|---|---|
| Gain Length: | 15.0 cm |
| Input Electrical Power to Discharge: | 2.5 kW |
| Input Gas Flowrates - He, $O_2$, $SF_6$, $H_2$: | 1.2, 0.07, scfm 0.12, 1.06 scfm |
| Cavity Pressure: | 5.5 Torr |
| Pumping Speed: | 330 cfm |
| Fundamental Output Power: | 35 watts |
| Fundamental Spectra: | 21P(9,8,7,6), 10P(9,8,7) |

The primary changes from the standard laser disclosed in FIG. 1, which was designed for use in the 2.8 or 3.8 micron spectral region, were: (1) the optical cavity was modified for low loss in the 1.3 micron region and a very high loss in the 2.8 micron region; and, (2) the pumping speed was increased to about 330 cfm which is approximately 30 cfm faster than the 300 cfm of the Model CLI laser.

Table I lists a total output power of 35 watts for the spectra operated on the fundamental HF bands $v=2$ to $v=1$ and $v=1$ to $v=0$. This provides a power level for comparison of the output powers produced at the first overtone transitions generated in accordance with the present invention.

Lasing was observed with some difficulty in the initial experiments since the laser output was quite sensitive to optical cavity alignment and flow conditions. A few simple tests demonstrated that the observed lasing was not at 2.8 microns, e.g., the beam was not absorbed by white paper, lucite or by ordinary pyrex. After optimization of cavity alignment, input gas flow rates and input power to the discharge tube, the maximum power observed was 10.5 watts cw. Beam size was about 2 mm in diameter, and the cavity mode for maximum power was $TEM_{1,2}$ (r, $\theta$). The 2-lobed mode may couple most efficiently to the gain distribution in the laser flow channel. The laser was tuned to produce $TEM_{0,0}$ with a small decrease in total power of approximately 20%.

To positively identify the emission, the beam was dispersed by a 300 lines per mm grating in a tunable mount and observed with a power meter at a position 8.5 m distance from the grating. A 0.6328 micron He-Ne beam co-aligned on the ir laser optical cavity was used as a calibration of grating angle by observing the 0th through 5th orders at the detector. The ir beam was observed in both 1st and 2nd orders of the grating, and a maximum of three spectral lines were produced when the laser was operated at maximum power (10.5 watts). Table II discloses the measured and calculated HF overtone spectra produced in accordance with the experiment. The P-branch transition energies of the HF $2\rightarrow0$ band were calculated using the Dunham coefficients for HF.

TABLE II

| Measured and Calculated HF Overtone Spectra, P-Branch, $2\rightarrow0$ Band | | | |
|---|---|---|---|
| Measured Laser Wavelengths (air)(microns) | Line Identity | Calculated Wavelength (vac.)(microns) | Maximum Power Spectral Distribution |
| — | 20P(1) | — | — |
| — | 20P(2) | | |
| 1.3179 | 20P(3) | 1.3126 | 0.41 |
| 1.3271 | 20P(4) | 1.3212 | 0.44 |
| 1.3366 | 20P(5) | 1.3305 | 0.15 |
| — | 20P(6) | — | — |
| — | 20P(7) | | |
| — | 20P(8) | | |
| — | 20P(9) | | |
| — | 20P(10) | | |

The observed laser emission lines were clearly identifiable as the 20P(3), 20P(4), and 20P(5) transitions of HF. The small discrepancies between the calculated and observed wavelengths are a result of the correction required since wavelength measurements were made in air. Evidently, 20P(4) is the strongest line of the $2\rightarrow0$ HF band under these operating conditions, since at low output power, i.e. below about 5 W, the laser operated on the single-line 20P(4).

To obtain an overtone rather than a fundamental wavelength output beam, the optical cavity was designed to have appropriate losses to allow the laser to reach lasing threshold for the overtone transitions, and to be below lasing threshold for the fundamental transitions. For example, the optics used in the first demonstration of the HF overtone laser had the following reflectivities:

TABLE III

| | Overtone* Reflectivity | Fundamental+ Reflectivity |
|---|---|---|
| Total Reflector | 99.9% | approx. 15% |
| Output Coupler | 94% | approx. 10% |

*average reflectivity at 1.3 to 1.4 microns
+average reflectivity at 2.6 to 3.0 microns The important comparison to be made between first overtone and fundamental HF laser performance is the cw output powers produced. In the first experiment disclosed above, it was demonstrated that the first overtone power of 10.5 watts/35 watts=30% of the fundamental output power. It is believed that this ratio can be substantially improved with further experimentation and better understanding of overtone laser processes to optimize laser operating parameters and optical cavity design. The lower bound of 30% is already sufficient to establish the overtone HF laser of the present invention as a practical high power laser in the 1.3 micron region.

Figure 5:
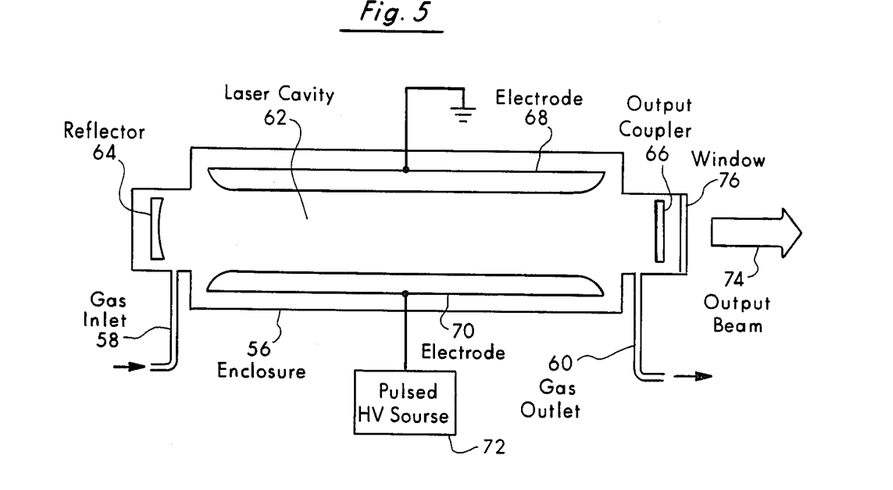
FIG. 5 is a schematic diagram of an electrical discharge HF overtone chemical laser comprising another embodiment of the present invention.

FIG. 5 is a schematic diagram of an electrical discharge HF overtone chemical laser which comprises another embodiment of the present invention. The electrical discharge laser illustrated in FIG. 5 comprises an enclosure 56 which is used to contain gases which flow through the enclosure 56 via gas inlet 58 and gas outlet 60. The gases comprise a first molecular gas containing fluorine which is admixed with a second molecular gas containing hydrogen. The first molecular gas can comprise $SF_6$, $NF_3$, $F_2$, or other fluorine containing gas. The second molecular gas can comprise $H_2$, $CH_4$, or other hydrocarbon. The admixed gases comprise a fuel- /oxydizer mixture which is circulated through laser cavity 62. Reaction inhibitors such as $O_2$ may be added to certain fuel/oxydizer mixtures and He may be used as a diluent.

Electrodes 68, 70 are disposed longitudinally along laser cavity 62. Electrode 68 is grounded while electrode 70 is coupled to a pulsed high voltage source 72. Pulsed high voltage source 72 generates a high voltage pulse which produces an electrical discharge transversely across laser cavity 62 between electrode 68 and electrode 70. The pulsed electrical discharge between electrode 68, 70 electrically dissociates some of the oxidizer (the molecular gas containing fluorine). Since the gas is admixed, free F atoms dissociated from the molecular gas containing fluorine combine with hydrogen from the molecular gas containing hydrogen to produce vibrationally excited HF molecules. The rate at which the HF molecules populate various vibrational states is illustrated in FIG. 2. Reflector 64 and output coupler 66 are designed in the same manner as the optical cavity illustrated in FIG. 3 to preferentially deplete $\Delta v=2$ vibrational transitions and preferentially attenuate $\Delta v=1$ vibrational transitions. The release of electromagnetic radiation produces optical oscillations between reflector 64 and output coupler 66 until sufficient energy is generated to produce laser output beam 74 which is transmitted through output coupler 66 and window 76.

Figure 6:
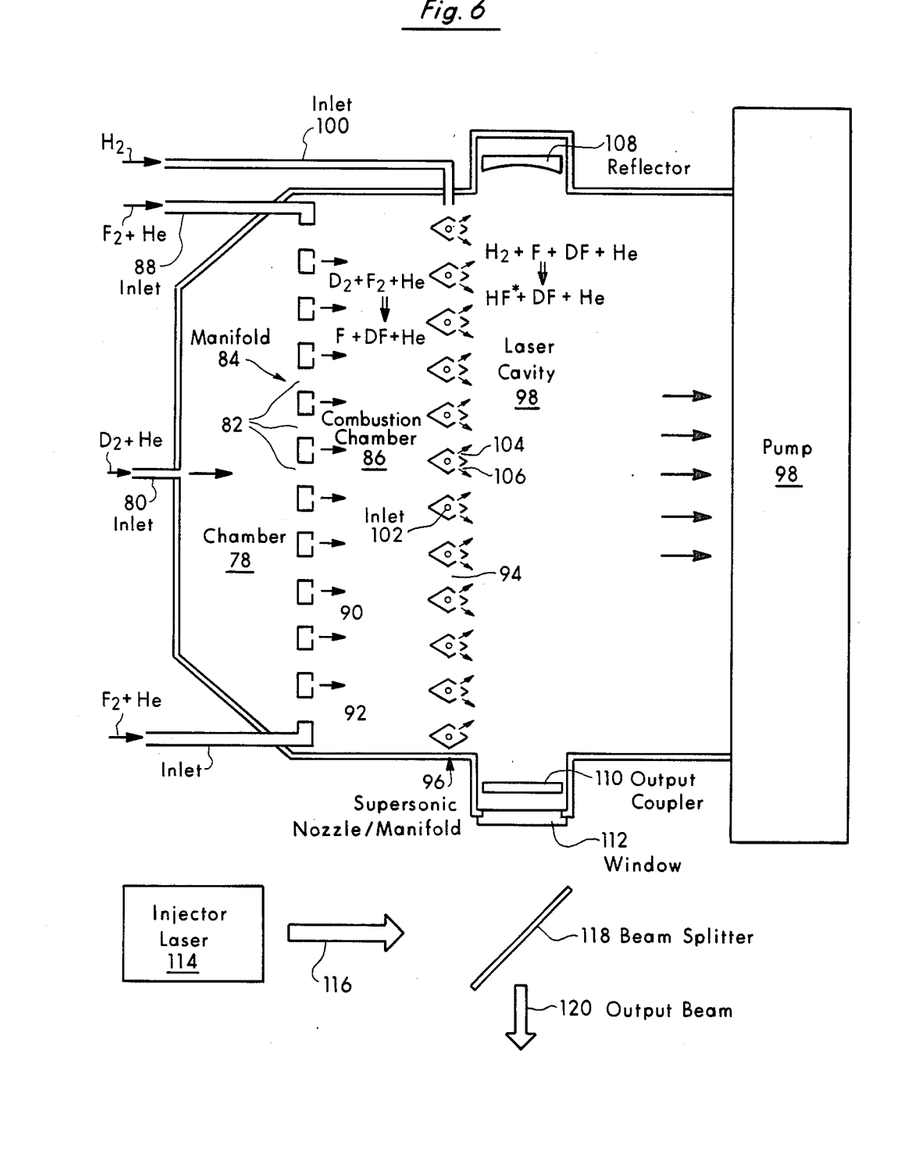
FIG. 6 is a schematic diagram of a combustion driven cw HF overtone chemical laser comprising another embodiment of the present invention.

FIG. 6 schematically illustrates a combustion driven HF overtone laser comprising another embodiment of the present invention. The combustion driven HF overtone laser illustrated in FIG. 6 generally operates by thermally dissociating F atoms from the molecular gas containing fluorine and combining the F atoms with a molecular gas containing hydrogen to produce vibrationally excited HF molecules. The combustion process is fueled by deuterium gas with a large excess of the oxidizer, i.e., the molecular gas containing fluorine.

As illustrated in FIG. 6, deuterium gas which is diluted by He is inserted in chamber 78 by way of inlet 80. The deuterium and He mixture fills chamber 78 and flows through the plurality of openings 82 in manifold 84 into combustion chamber 86. A fluorine gas, diluted by He, is inserted through a manifold 84 via inlet 88 to combine with the deuterium and He gas in combustion chamber 86. The fluorine and He mix enters the combustion chamber 86 through openings 90 and manifold 84, as illustrated by arrow 92.

The deuterium and fluorine gases, which are diluted with He, are combined to produce the reaction:

$$D_2 + nF_2 + He \rightarrow (2n-2)F + 2DF + He \qquad (4)$$

where n is approximately 2–5.

Alernatively, $NF_3$ can be used as an oxidizer to produce the reaction:

$$D_2 + n\,NF_3 \rightarrow (3n-2)F + 2DF + \frac{n}{2}N_2 + He \qquad (5)$$

where N is approximately 2–5.

Thermochemical equilibrium within the combustion chamber 86 produces large concentrations of atomic fluorine, as indicated in equations 4 and 5.

The free F atoms, the deuterium fluoride and the He are accelerated through openings 94 in supersonic nozzle/manifold 96 by pump 98. Rapid expansion of this composition occurs in supersonic nozzle/manifold 96 as it passes from a high pressure area in combustion chamber 86 to a low pressure area in laser cavity 98. A substantially adiabatic expansion occurs through supersonic nozzle/manifold 96 such that the chemical composition (F+DF+He) is frozen.

A second molecular gas containing hydrogen, such as $H_2$, is inserted into laser cavity 98 by way of inlet 100 in the manifold portion of supersonic nozzle/manifold 96. Inlet 100 is coupled to a series of inlets 102 in supersonic nozzle/manifold 96 which distributes the second molecular gas containing hydrogen to each of the supersonic nozzle/manifold elements illustrated in FIG. 6. The second molecular gas containing hydrogen is then inserted into laser cavity 98 via openings 104, 106 in each of the supersonic nozzle/manifold elements. This causes a mixing of the second molecular gas containing hydrogen with the cooled, thermally dissociated composition (F+DF+He) which has been substantially adiabatically expanded through supersonic nozzle/manifold 96. This produces the reaction:

$$H_2 + F + DF + He \rightarrow HF^* + + DF + He \qquad (6)$$

The reaction of the free F atoms with hydrogen produces vibrationally excited HF molecules as indicated in equation 6. Of course, other molecular gases containing hydrogen can be utilized to produce vibrationally excited HF molecules.

Preferential depletion of $\Delta v=2$ overtone vibrational transitions can be achieved by either optical attenuation of $\Delta v=1$ transitions combined with enhancement of $\Delta v=2$ vibrational transitions, or, injection of optical energy into the laser cavity 98 to induce overtone transitions. This technique is called "preinjection" and can be utilized in the combustion driven laser illustrated in FIG. 6, or in the electrical discharge laser illustrated in FIG. 5.

Selective attenuation of $\Delta v=1$ vibrational transitions and enhancement of $\Delta v=2$ transitions can be achieved by providing an optical cavity such as that described in FIG. 3. In that regard, reflector 108 would be designed to be highly reflective to electromagnetic radiation resulting from $\Delta v=2$ vibrational transitions and nonreflective for $\Delta v=1$ vibrational transitions. Similarly, output coupler 110 would have high attenuation for $\Delta v=1$ transitions and a partial reflectivity for $\Delta=2$ transitions. In this manner, the vibrationally excited HF molecules produced within laser cavity 98, as a result of the reaction of equation 6, are preferentially depleted over the $\Delta v=2$ vibrational transitions within laser cavity 98. Window 112 passes laser emissions resulting from $\Delta v=2$ vibrational transitions.

The alternative method of preferentially depleting $\Delta v=2$ vibrational transitions through the use of an independent injector laser 114 is schematically disclosed in FIG. 6. Injector 114 produces laser emissions at an overtone transition frequency to be produced in laser cavity 98. The injected optical energy 116 is reflected by beam splitter 118 such that it is inserted in laser cavity 98 via window 112 and output coupler 110. The injected optical energy 116 forces overtone transitions to occur within laser cavity 98 at the same frequency as the injected optical energy 116. This causes an output beam 120 to be produced which penetrates beam splitter 118. Using this technique, specific optical modes and optical transitions can be selected to lase from laser cavity 98.

Figure 7:
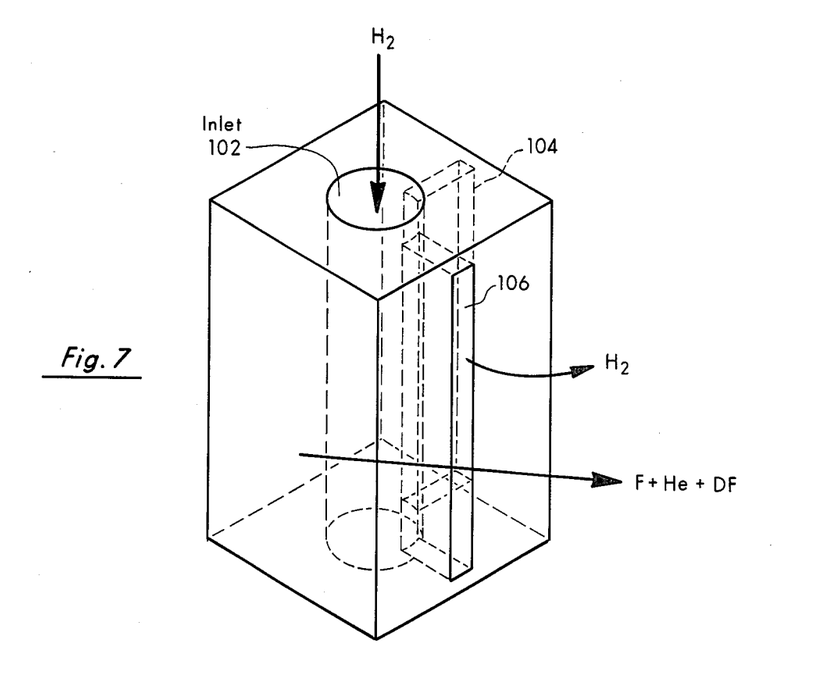
FIG. 7 is a schematic diagram of the supersonic nozzle/mainfold illustrated in FIG. 6.

FIG. 7 is a detailed schematic diagram of one element of supersonic nozzle/manifold 96. As illustrated in FIG. 7, inlet 102 is coupled to inlet 100 for insertion of a gas containing hydrogen, such as $H_2$, into the nozzle/manifold element. The hydrogen containing gas is distributed to manifold outlets 104, 106 such that the hydrogen containing gas escapes and is mixed with the substantially adiabatically expanded composition (F+DF+He). The combination of the molecular gas containing hydrogen and the molecular gas containing fluorine causes a reaction to produce excited HF molecules. DF molecules are used as a fuel to generate heat for thermal dissociation of the molecular gas containing fluorine to prevent collisional deactivation of the laser species within laser cavity 98. Vibrationally de-excited DF molecules do not have optical absorption at HF laser transition wavelengths. DF molecules are less efficient in de-exciting HF molecules as a result of collisions. Consequently, collisional deactivation of the excited HF molecules occurs at a less rapid rate when deuterium is used as a fuel rather than hydrogen.

Consequently, the present invention produces laser emissions from excited HF molecules at overtone frequencies which can be sealed to high output powers. This is achieved using thermal dissociation and electrical dissociation of a molecular gas containing fluorine to produce F atoms and reacting the F atoms with a molecular gas containing hydrogen to produce excited HF molecules. The overtone transitions, i.e. $\Delta v=2$ vibrational transitions, are then preferentially depleted from the excited HF molecules to produce electromagnetic radiation which is optically resonated in an optical resonant cavity to produce a laser emission. Preferential depletion of $\Delta v=2$ vibrational transitions is produced by selective attenuation of $\Delta v=1$ transitions and optical enhancement of $\Delta v=2$ vibrational transitions, or by injection of optical radiation in the laser cavity at overtone transition frequencies to force overtone transitions within the laser cavity. The present invention is capable of producing high powers from a chemically driven laser in the near infrared spectral region. This is extremely useful for atmospheric transmission of laser beams and transmission through various solid state media such as fiber optics.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable other skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of producing essentially coherent electromagnetic emissions with high efficiency from excited HF molecules at overtone frequencies comprising the steps of:
   thermally dissociating a molecular gas containing fluorine to produce F atoms;
   reacting said F atoms with a gas containing hydrogen to produce excited HF molecules;
   preferentially depleting $\Delta v=2$ overtone vibrational transitions of said excited HF molecules to produce said electromagnetic emissions at overtone frequencies such that said electromagnetic emissions from said $\Delta v=2$ overtone vibrational transitions have an output power which is a significant percentage of the output power obtainable from $\Delta v=1$ fundamental vibrational transitions of excited HF molecules so that said electromagnetic emissions produced by said $\Delta v=2$ overtone vibrational transitions can be efficiently scaled to high output powers.

2. The method of claim 1 further comprising the step of:
   causing said electromagnetic radiation to resonate in an optical cavity to produce a laser emission.

3. The method of claim 1 wherein said step of thermally dissociating said molecular gas containing fluorine comprises:
   generating heat by a chemical reaction with a reactant and said molecular gas containing fluorine such that sufficient heat is generated to thermally dissociate said molecular gas containing fluorine to produce F atoms.

4. The method of claim 3 wherein said reactant comprises $D_2$ and said molecular gas containing fluorine comprises $F_2$.

5. The method of claim 1 wherein said step of preferentially depleting $\Delta v=2$ vibrational transitions of said excited HF molecules comprises the step of:
   injecting an independent source of electromagnetic radiation into an optical cavity containing said excited HF molecules.

6. The method of claim 1 wherein said step of preferentially depleting vibrational transitions of said excited HF molecules comprises the step of:
   selectively attenuating $\Delta v=1$ vibrational transitions of said excited HF molecules.

7. The method of claim 1 wherein said step of preferentially depleting said $\Delta v=2$ vibrational transitions comprises preferentially depleting vibrational transitions from $v=2$ to $v=0$ vibrational levels.

8. The method of claim 1 wherein said step of electrically dissociating comprises applying an electrical discharge through said molecular gas containing fluorine and said molecular gas containing hydrogen in an optical resonant cavity.

9. The method of claim 1 wherein said step of preferentially depleting $\Delta v=2$ vibrational transitions of said excited HF molecules comprises the step of:
   injecting an independent source of electromagnetic radiation into an optical cavity containing said excited HF molecules.

10. The method of claim 1 wherein said step of preferentially depleting vibrational transitions of said excited HF molecules comprises the step of:
    selectively attenuating $\Delta v=1$ vibrational transitions of said excited HF molecules.

11. The method of claim 1 wherein said step of preferentially depleting said $\Delta v=2$ vibrational transitions comprises preferentially depleting vibrational transitional from $v=2$ to $v=0$ vibrational levels.

12. A method of producing essentially coherent electromagnetic emissions with high efficiency from excited HF molecules at overtone frequencies comprising the steps of:
    electrically dissociating a molecular gas containing fluorine to produce F atoms;

reacting said F atoms with a gas containing hydrogen to produce excited HF molecules;

preferentially depleting $\Delta v=2$ overtone vibrational transitions of said excited HF molecules to produce said electromagnetic emissions at said overtone frequencies such that said electromagnetic emissions from said $\Delta v=2$ overtone vibrational transitions have an output power which is a significant percentage of the output power obtainable from $\Delta v=1$ fundamental vibrational transitions of excited HF molecules so that said electromagnetic emissions produced by said $\Delta v=2$ overtone vibrational transitions can be efficiently scaled to high output powers.

13. The method of claim 12 comprising the further step of:

causing said electromagnetic radiation to resonate in an optical cavity to produce a laser emission.

14. The method of claim 12 further comprising the step of:

admixing said molecular gas containing fluorine with said gas containing hydrogen prior to electrically dissociating said molecular gas containing fluorine.

15. The method of claim 12 wherein said step of reacting said F atoms with a gas containing hydrogen comprises the step of:

combining said F atoms with said gas containing hydrogen subsequent to electrically dissociating said molecular gas containing fluorine.

16. A high efficiency HF overtone continuous wave chemical laser for producing essentially coherent laser emissions which can be scaled to high powers comprising:

electrical dissociation means for dissociating F atoms from a molecular gas containing fluorine by producing an electrical discharge through said molecular gas containing fluorine;

means for combining said F atoms with a molecular gas containing hydrogen to generate excited HF molecules;

optical cavity means for causing preferential depletion of $\Delta v=2$ overtone vibrational transitions of excited HF molecules by selectively attenuating $\Delta v=1$ fundamental vibrational transitions such that output power of said HF overtone continuous wave laser resulting from said $\Delta v=2$ overtone vibrational transitions is a significant percentage of the output power obtainable from said $\Delta v=1$ fundamental vibrational transitions so that said HF overtone continuous wave chemical laser can be efficiently scaled to high output powers.

17. The laser of claim 16 wherein said optical cavity means comprises:

optical means for enhancing overtone vibrational transitions of said excited HF molecules from the $v=2$ to $v=0$ vibrational levels and attenuating transitions from the $v=2$ to $v=1$ vibrational levels and the $v=1$ to $v=0$ vibrational levels.

18. The laser of claim 17 wherein said optical means comprises:

reflector means having a high reflectivity at overtone transition wavelengths and a low reflectivity at fundamental transition wavelengths;

output coupler means having a partial reflectivity at overtone transition wavelengths and a low reflectivity at fundamental transition wavelengths.

19. The laser of claim 16 wherein said overtone transitions of said excited HF molecules comprise P branch transitions.

20. The laser of claim 16 wherein said electrical dissociation means comprises an electrical discharge cavity.

21. The laser of claim 16 wherein said molecular gas containing fluorine comprises $SF_6$.

22. The laser of claim 16 wherein said molecular gas containing fluorine comprises $NF_3$.

23. The laser of claim 16 wherein said molecular gas containing fluorine comprises $F_2$.

24. A high efficiency electrical discharge HF overtone pulsed chemical laser comprising:

a first molecular gas containing fluorine which is capable of being dissociated by an electrical discharge to produce F atoms;

a second molecular gas containing hydrogen which is admixed with said first molecular gas to produce a fuel oxidizer mixture;

optical cavity means for causing preferential depletion of $\Delta v=2$ overtone vibrational transitions of excited HF molecules by selectively attenuating $\Delta v=1$ fundamental vibrational transitions;

electrical discharge means for dissociating F atoms from said fuel oxidizer mixture to produce said excited HF molecules in said optical cavity by the chemical reaction of said F atoms with said second molecular gas, said preferential depletion of said $\Delta v=2$ vibrational transitions having an efficiency sufficient to generate an essentially coherent laser emission from said optical cavity means which can be efficiently scaled to output powers substantially greater than threshold levels.

25. The laser of claim 24 wherein said optical cavity means comprises:

optical reflectors having a sufficiently high reflectivity at wavelengths of optical radiation produced by said preferential depletion of $\Delta v=2$ vibrational transitions of said excited HF molecules to produce an overtone laser emission and a sufficiently low reflectivity at wavelengths of optical radiation produced by depletion of $\Delta v=1$ vibrational transitions to prevent production of threshold power levels of fundamental laser emissions resulting from said depletion of $\Delta v=1$ vibrational transitions.

26. A high efficiency electrical discharge HF overtone pulsed chemical laser comprising:

a first molecular gas containing fluorine which is capable of being dissociated by an electrical charge to produce F atoms;

a second molecular gas containing hydrogen which is admixed with said first molecular gas to produce a fuel oxidizer mixture;

optical cavity means for providing resonant oscillations of electromagnetic radiation on at least one overtone spectral line produced by $\Delta v=2$ overtone vibrational transitions of excited HF molecules;

electrical discharge means for dissociating F atoms from said fuel oxidizer mixture to produce said excited HF molecules in said optical cavity by the chemical reaction of said F atoms with said second molecular gas;

means for generating an independent source of electromagnetic radiation on said at least one overtone spectral line;

means for injecting said independent source of electromagnetic radiation in said optical cavity means for causing preferential depletion of said $\Delta v=2$ overtone vibrational transitions to produce said electromagnetic radiation on said at least one overtone spectral line, said preferential depletion of said $\Delta v=2$ overtone vibrational transitions having an efficiency sufficient to generate an essentially coherent laser emission from said optical cavity means on said at least one spectral line which can be efficiently scaled to output powers substantially greater than threshold levels.

27. The laser of claim 26 wherein said optical cavity means comprises:
a first reflector which is virtually totally reflective to said electromagnetic radiation on said at least one spectral line;
a second reflector which is partially reflective to said electromagnetic radiation on said at least one spectral line.

28. The laser of claim 26 wherein said first molecular gas comprises $SF_6$.

29. The laser of claim 26 wherein said first molecular gas comprises $NF_3$.

30. The laser of claim 26 wherein said first molecular gas comprises $F_2$.

31. The laser of claim 26 wherein said second molecular gas comprises $H_2$.

32. The laser of claim 26 wherein said second molecular gas comprises $CH_4$.

33. The laser of claim 26 wherein said second molecular gas comprises a hydrocarbon.

34. A high efficiency combustion driven continuous wave HF overtone chemical laser comprising:
combustion chamber means for thermally dissociating a fluorine containing gas from heat produced through a chemical reaction of said fluorine containing gas and a reactant to produce a reaction product and F atoms;
expansion means for reducing the temperature of said reaction product and said F atoms;
means for combining a hydrogen containing gas with said F atoms to produce excited HF molecules;
optical cavity means for causing preferential depletion of $\Delta v=2$ overtone vibrational transitions of said excited HF molecules by selective attenuation of $\Delta v=1$ fundamental vibrational transitions, said preferential depletion of said $\Delta v=2$ vibrational transitions having an efficiency sufficient to allow said overtone chemical laser to produce an essentially coherent overtone laser emission which can be efficiently scaled to output powers substantially greater than threshold levels.

35. The laser of claim 34 wherein said expansion means comprises supersonic nozzle means for substantially expanding said reaction product and said F atoms.

36. The laser of claim 34 wherein said optical cavity means comprises:
optical reflectors having a sufficiently high reflectivity at wavelengths of optical radiation produced by said preferential depletion of $\Delta v=2$ vibrational transitions of said excited HF molecules to produce an overtone laser emission and a sufficiently low reflectivity at wavelengths of optical radiation produced by depletion of $\Delta v=1$ vibrational transitions to prevent production of threshold power levels of fundamental laser emissions resulting from said depletion of $\Delta v=1$ vibrational transitions.

37. A high efficiency combustion driven continuous wave HF overtone chemical laser comprising:
combustion chamber means for thermally dissociating a fluorine containing gas from head produced by a chemical reaction of said fluorine containing gas and a reactant to produce a reaction product and F atoms;
expansion means for reducing the temperature of said reaction product and said F atoms;
means for combining a hydrogen containing gas with said F atoms to produce excited HF molecules;
optical cavity means for providing resonant oscillations of electromagnetic radiation on at least one overtone spectral line produced by $\Delta v=2$ vibrational transitions of said excited HF molecules;
means for generating an independent source of electromagnetic radiation on said at least one overtone spectral line;
means for injecting said independent source of electromagnetic radiation in said optical cavity means for causing preferential depletion of said $\Delta v=2$ vibrational transitions to produce said electromagnetic radiation on said at least one overtone spectral line, said preferential depletion of said $\Delta v=2$ vibrational transitions having an efficiency sufficient to generate an essentially coherent laser emission from said optical cavity means on said at least one spectral line which can be efficiently scaled to output powers substantially greater than threshold levels.

38. The laser of claim 37 wherein said expansion means comprises supersonic nozzle means for substantially adiabatically expanding said reaction product and said F atoms.

39. The laser of claim 37 wherein said fluorine containing gas comprises $F_2$, said reactant comprises $D_2$, said reaction product comprises DF, and said hydrogen containing gas comprises $H_2$.

40. The laser of claim 37 wherein said fluorine containing gas comprises $NF_3$, said reactant comprises $D_2$, said reaction product comprises DF, and said hydrogen containing gas comprises $H_2$.

41. A method of producing high efficiency essentially coherent electromagnetic emissions from excited HF molecules at overtone frequencies which can be scaled to high output powers comprising the steps of:
thermally dissociating a molecular gas containing fluorine to produce F atoms;
reacting said F atoms with a gas containing hydrogen to produce excited HF molecules;
preferentially depleting $\Delta v=2$ overtone vibrational transitions of said excited HF molecules to produce said electromagnetic emissions at overtone frequencies with a conversion efficiency which is approximately 30% or greater of the conversion efficiency of $\Delta v=1$ fundamental vibrational transitions.

42. A method of producing high efficiency essentially coherent electromagnetic emissions from excited HF molecules at overtone frequencies which can be scaled to high output powers comprising the steps of:
electrically dissociating a molecular gas containing fluorine to produce F atoms;
reacting said F atoms with a gas containing hydrogen to produce excited HF molecules;
preferentially depleting $\Delta v=2$ overtone vibrational transitions of said excited HF molecules to produce said electromagnetic emissions at said overtone frequencies with a conversion efficiency which is approximately 30% greater of the conversion efficiency of depletion of $\Delta v=1$ fundamental vibrational transitions.

43. A high efficiency HF overtone continuous wave essentially coherent chemical laser comprising:
   electrical dissociation means for dissociating F atoms from a molecular gas containing fluorine by producing an electrical discharge through said molecular gas containing fluorine;
   means for combining said F atoms with a molecular gas containing hydrogen to generate excited HF molecules;
   optical cavity means for causing preferential depletion of $\Delta v=2$ vibrational transitions of excited HF molecules with a conversion efficiency which is approximately 30% or greater of the conversion efficiency of depletion of $\Delta v=1$ fundamental vibrational transitions, and for selectively attenuating said $\Delta v=1$ fundamental vibrational transitions.

44. A high efficiency electrical discharge HF overtone essentially coherent pulsed chemical laser which can be scaled to high output powers comprising:
   a first molecular gas containing fluorine which is capable of being dissociated by an electrical discharge to produce F atoms;
   a second molecular gas containing hydrogen which is admixed with said first molecular gas to produce a fuel oxidizer mixture;
   optical cavity means for causing preferential depletion of $\Delta v=2$ overtone vibrational transitions of excited HF molecules by selectively attenuating $\Delta v=1$ fundamental vibrational transitions;
   electrical discharge means for dissociating F atoms from said fuel oxidizer mixture to produce said excited HF molecules in said optical cavity by the chemical reaction of said F atoms with said second molecular gas such that said preferential depletion of $\Delta v=2$ overtone vibrational transitions causes a laser emission from said optical cavity means having an output power which is approximately 30% or greater of the output power of a laser emission resulting from depletion of said $\Delta v=1$ fundamental vibration transitions.

45. A high efficiency electrical discharge HF overtone essentially coherent pulsed chemical laser which can be scaled to high output powers comprising:
   a first molecular gas containing fluorine which is capable of being dissociated by an electrical charge to produce F atoms;
   a second molecular gas containing hydrogen which is admixed with said first molecular gas to produce a fuel oxidizer mixture;
   optical cavity means for providing resonant oscillations of electromagnetic radiation on at least one overtone spectral line produced by $v=2$ to $v=0$ overtone vibrational transitions of excited HF molecules;
   electrical discharge means for dissociating F atoms from said fuel oxidizer mixture to produce said excited HF molecules in said optical cavity by the chemical reaction of said F atoms and said second molecular gas;
   means for generating an independent source of electromagnetic radiation on said at least one overtone spectral line;
   means for injecting said independent source of electromagnetic radiation in said optical cavity means for causing preferential depletion of said $v=2$ to $v=0$ overtone vibrational transitions to produce said electromagnetic radiation on said at least one overtone spectral line such that a laser emission is generated from said optical cavity means on said at least one spectral line having an output power which is approximately 30% or greater of the output power of a laser emission resulting from depletion of $v=2$ to $v=1$ and $v=1$ to $v=0$ fundamental vibrational transitions.

46. A high efficiency combustion driven continuous wave HF overtone essentially coherent chemical laser which can be scaled to high output powers comprising:
   combustion chamber means for thermally dissociating a fluorine containing gas from heat produced through the chemical reaction of said fluorine containing gas and a reactant to produce a reaction product and F atoms;
   expansion means for reducing the temperature of said reaction product and said F atoms;
   means for combining a hydrogen containing gas with said F atoms to produce excited HF molecules;
   optical cavity means for causing preferential depletion of $v=2$ to $v=0$ vibrational transitions of said excited HF molecules by selective attenuation of $v=2$ to $v=1$ and $v=1$ to $v=0$ vibrational transitions to produce an overtone laser emission from said optical cavity means having an output power which is approximately 30% or greater of the output power of a laser emission produced by depletion of said $v=2$ to $v=1$ and $v=1$ to $v=0$ fundamental transitions.

47. A combustion driven continuous wave HF overtone chemical laser comprising:
   combustion chamber means for thermally dissociating a fluorine containing gas from head produced by a chemical reaction of said fluorine containing gas and a reactant to produce a reaction product and F atoms;
   expansion means for reducing the temperature of said reaction product and said F atoms;
   means for combining a hydrogen containing gas with said F atoms to produce excited HF molecules;
   optical cavity means for providing resonant oscillations of electromagnetic radiation on at least one overtone spectral line produced by $v=2$ to $v=0$ vibrational transitions of said excited HF molecules;
   means for generating an independent source of electromagnetic radiation on said at least one overtone spectral line;
   means for injecting said independent source of electromagnetic radiation in said optical cavity means for causing preferential depletion of said $v=2$ to $v=0$ vibrational transitions to produce said electromagnetic radiation on said at least one overtone spectral line such that a laser emission is generated from said optical cavity means on said at least one spectral line having an output power which is approximately 30% or greater of the output power of a laser emission produced by depletion of $v=2$ to $v=1$ and $v=1$ to $v=0$ fundamental transitions.

* * * * *